N. RUSK.
MULTIPLE EXPOSURE ATTACHMENT FOR CAMERAS.
APPLICATION FILED JUNE 4, 1912.
1,056,588.
Patented Mar. 18, 1913.
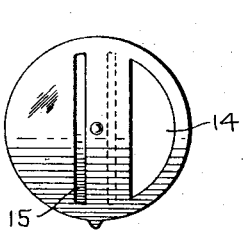
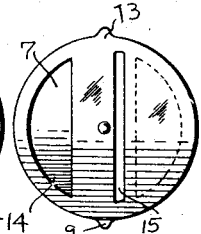
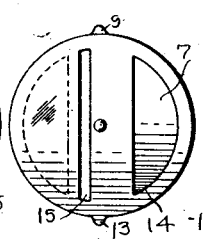
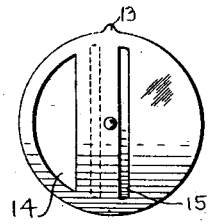
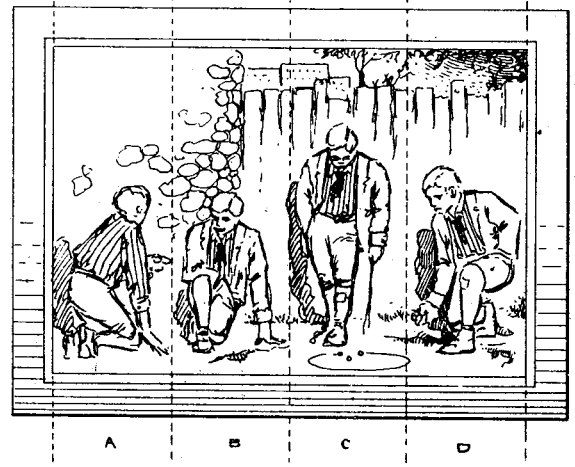
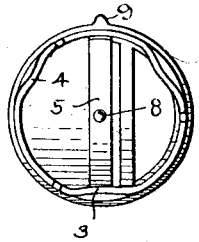
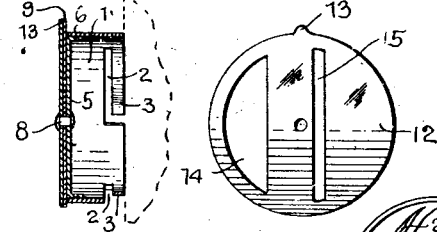
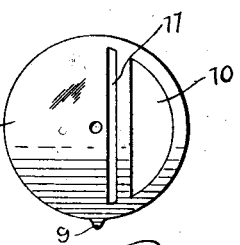
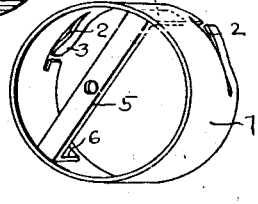
WITNESSES
INVENTOR
NEWTON RUSK
his Attorney

UNITED STATES PATENT OFFICE.

NEWTON RUSK, OF SAN DIEGO, CALIFORNIA.

MULTIPLE-EXPOSURE ATTACHMENT FOR CAMERAS.

1,056,588. Specification of Letters Patent. Patented Mar. 18, 1913.

Application filed June 4, 1912. Serial No. 701,625.

*To all whom it may concern:*

Be it known that I, NEWTON RUSK, a citizen of the United States, residing at San Diego, in the county of San Diego and State of California, have invented certain new and useful Improvements in Multiple-Exposure Attachments for Cameras, of which the following is a specification, reference being had therein to the accompanying drawing.

This invention relates to shutters for a camera, and has for its object the production of an efficient shutter which may be operated so as to take four different photographs upon the same plate of a person in four different positions.

Another object of this invention is the production of an efficient shutter which may be attached to a camera in such a manner as to be efficiently operated, and at the same time not be in the way while taking a picture.

With these and other objects in view, this invention consists of certain novel constructions, combinations, and arrangements of parts, as will be hereinafter fully described and claimed.

In the drawings:—Figure 1 is a plan view of the shutter while taking the picture at one end of the plate. Fig. 2 is a plan view of the shutter while taking the second picture. Fig. 3 is a plan view of the shutter when taking the third picture. Fig. 4 is a plan view of the shutter while taking the fourth picture. Fig. 5 is a rear elevation of the shutter and frame. Fig. 6 is a central vertical section through the shutter. Fig. 7 is a plan view of the outer shutter. Fig. 8 is a plan view of the inner shutter. Fig. 9 is a perspective view of the shutter supporting casing. Fig. 10 is a plan view showing the photographs which may be taken by use of the present shutter.

The present device is especially adapted to be attached to the lens of the camera, and comprises a cylindrical body portion 1 which is provided near its rear edge with a plurality of bayonet slots 2 for constituting spring tongues 3. These spring tongues are bent as indicated at 4 to allow the casing 1 to fit tightly over the lens of a camera. It should be understood that these casings 1 may be formed of different size to accommodate the different cameras to be used in connection therewith. A casing 1 is provided with a centrally transversely extending shutter supporting rib 5 which rib is provided with a laterally extending foot 6 for firmly holding the rib 5 in engagement with the casing 1. An inner shutter disk 7 is pivotally secured upon the transversely extending rib 5 by means of a pivot pin 8, and an operating knob 9 is formed upon the outer periphery of the shutter disk 7 for facilitating the rotation of the shutter disk 7 upon the casing 1. The inner shutter disk 7 is provided with a segmental aperture 10 near one side and an elongated comparatively narrow slot 11 is formed adjacent the slot or opening 10. An outer shutter disk 12 is pivoted upon the pin 8 similar to the disk 7, and this disk 12, like the disk 7 is provided with an operating knob 13. A segmental opening 14 is formed near one side of the disk 12 and extending parallel with the opening 14, and upon the opposite side of the pivot 8 is formed an elongated comparatively narrow slot 15. It should be noticed that in the disk 7 a comparatively narrow opening slot 11 is formed upon the same side of the pivot as the opening 10.

By considering Figs. 1 to 4 inclusive the operation of the device will be clearly understood for upon taking the first picture, the lens of the camera is opened, and the outer disk 12 is rotated so as to have the opening 14 thereof register with the opening 10 of the inner disk thereby taking the picture marked "A". Then by again rotating the outer disk one-half turn, the comparatively narrow slot 15 of the outer disk will register with the slot 11 of the inner disk thereby taking the picture marked "B". In order to take the third picture, both the inner and outer disks are turned one-half way around to allow the slot 15 of the outer disk and the slot 11 of the inner disk to register but this time upon the opposite side of the pivot point 8, thereby taking the picture marked "C". The fourth picture is then taken by rotating the inner disk one-half revolution so as to have the aperture 14 of the outer disk register with the aperture 10 of the inner disk. By following out the letters A, B, C and D, with reference to the Figs. 1, 2, 3 and 4 in connection with the pictures indicated in Fig. 10 it is thought that the operation of the device will be clear, especially from the above description.

It should be understood that the present device is especially adapted to take four photographs upon one plate or volume without showing any dividing lines thereon. It should also be understood that a very simple and efficient device has been produced which consists of a minimum number of parts which may be very cheaply manufactured and attached to any camera without the necessity of manufacturing an especially constructed camera to be used therewith.

What is claimed is:—

1. An attachment for a camera adapted to take four continuous pictures upon one sensitized plate comprising a body provided with means for holding the same upon a support, a plurality of shutters pivotally secured upon said body, each shutter provided with apertures formed therein adapted to register at determined times for causing an exposure of a portion of a sensitized plate for causing the photograph to be taken thereon.

2. An attachment for a camera for the purpose specified comprising a cylindrical body, a plurality of spring tongues formed upon said body and capable of engaging a support for holding said body upon said support, a transversely extending rib engaging said cylindrical body, an inner and outer disk pivotally secured to said rib and provided with spaced apertures adapted to register at specified times for causing an exposure of a sensitized sheet at different points, as said inner and outer disks are rotated at different times.

3. An attachment of the class described comprising a casing, means for holding said casing upon a support, a rib carried by said casing, an inner disk pivotally secured to said rib and provided with a segmental opening, said disk also provided with a comparatively narrow elongated opening placed upon the same side of said pivot of said disk, as said segmental opening, an outer disk pivotally secured upon said transversely extending rib and provided with a segmental opening near one side and provided with an elongated comparatively narrow opening upon the opposite side of said pivot point of said disk, an operating knob formed upon each disk, said inner and outer disks so arranged as to cause said segmental opening of said outer disk to register with the segmental opening of the inner disk when being rotated one-half turn to expose one end of a sensitized sheet, cause said elongated aperture of said outer disk to register with said elongated aperture of said inner disk and rotated another half turn, said inner and outer disk then being adapted to be rotated together causing the third exposure upon a sensitized sheet, and said inner disk adapted to be rotated to expose the fourth portion of a sensitized sheet for bringing the segmental opening of said inner disk to such a position as to register with said segmental opening of said outer disk.

In testimony whereof I hereunto affix my signature in presence of two witnesses.

NEWTON RUSK.

Witnesses:
A. RUSK,
GEO. D. PAGE.